(12) United States Patent
Mrusek et al.

(10) Patent No.: US 10,050,537 B2
(45) Date of Patent: Aug. 14, 2018

(54) RESONANT CONVERTER AND METHOD FOR CONTROLLING A RESONANT CONVERTER

(71) Applicant: KONINKLIJKE PHILIPS N.V., Eindhoven (NL)

(72) Inventors: Helmut Mrusek, Hamburg (DE); Sebastian Jantke, Hamburg (DE); Sven Schiller, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/306,506

(22) PCT Filed: Apr. 16, 2015

(86) PCT No.: PCT/EP2015/058282
§ 371 (c)(1),
(2) Date: Oct. 25, 2016

(87) PCT Pub. No.: WO2015/162054
PCT Pub. Date: Oct. 29, 2015

(65) Prior Publication Data
US 2017/0054377 A1     Feb. 23, 2017

(30) Foreign Application Priority Data
Apr. 25, 2014   (EP) .................................... 14165946

(51) Int. Cl.
*H02M 7/5383* (2007.01)
*H02M 3/335* (2006.01)
(Continued)

(52) U.S. Cl.
CPC ......... *H02M 3/33507* (2013.01); *H02M 7/48* (2013.01); *H02M 2001/0032* (2013.01);
(Continued)

(58) Field of Classification Search
CPC . H02M 2001/0058; H02M 2007/4815; H02M 2001/0054; H02M 2001/0048;
(Continued)

(56) References Cited

U.S. PATENT DOCUMENTS 8,385,092 B1   2/2013   Shekhawat
2009/0001949 A1*   1/2009   Komori ............... H02M 3/1584
323/272

(Continued)

OTHER PUBLICATIONS

Makky, A; Parallel Operation of IGBts Modular converter System for High Power High Frequency Induction Heating Applications; IEEE, 12th International Middle-east Power System Conference, Mar. 2008, 577-582.*

*Primary Examiner* — Harry Behm
(74) *Attorney, Agent, or Firm* — Larry Liberchuk (57) ABSTRACT

A resonant converter (100) includes at least two transistor switches (S1-S8), out of which at least two are connected in parallel, and out of which a number of available transistor switches (S1-S8) is available for performing a current switching of the resonant converter (100). A controlling module (101) is configured to determine whether an output power of the resonant converter (100) is below an output power threshold value. A switching module (102) is configured to employ a reduced number of transistor switches out of the number of available transistor switches (S1-S8), if the output power of the resonant converter (100) is below the output power threshold value. The reduced number is at least declined by one compared to the number of available transistor switches (S1-S8). The switching module (102) is configured to permute the employed reduced number of transistor switches over the available transistor switches (S1-S8).

11 Claims, 4 Drawing Sheets

(51) Int. Cl.
*H02M 7/48* (2007.01)
*H02M 1/00* (2006.01)

(52) U.S. Cl.
CPC ............ *H02M 2001/0058* (2013.01); *H02M 2007/4815* (2013.01); *Y02B 70/1441* (2013.01); *Y02B 70/16* (2013.01)

(58) Field of Classification Search
CPC .......... H02M 7/5383; H02M 7/53846; H02M 7/53862
See application file for complete search history.

(56) References Cited

U.S. PATENT DOCUMENTS

| | | | |
|---|---|---|---|
| 2009/0296441 A1 | 12/2009 | Klemt | |
| 2011/0007528 A1* | 1/2011 | Scheel | ............ H02M 3/33523 363/21.03 |
| 2013/0279228 A1 | 10/2013 | Zhu | |

* cited by examiner

RESONANT CONVERTER AND METHOD FOR CONTROLLING A RESONANT CONVERTER

CROSS-REFERENCE TO PRIOR APPLICATIONS

This application is the U.S. National Phase application under 35 U.S.C. § 371 of International Application No. PCT/IB2015/058282, filed on Apr. 16, 2015, which claims the benefit of European Patent Application No. 14165946.6, filed on Apr. 25, 2014. This application is hereby incorporated by reference herein.

FIELD OF THE INVENTION

The present invention relates to electrical inverters based on resonant current oscillation. In particular, the present invention relates to a resonant converter and a method for controlling a resonant converter.

BACKGROUND OF THE INVENTION

An insulated-gate bipolar transistor (IGBT) is a three-terminal power semiconductor device primarily used as an electronic switch and in newer devices is noted for combining high efficiency and fast switching high power IGBT inverter often use paralleled IGBT modules. These paralleled IGBT modules are often driven synchronously.

U.S. Pat. No. 8,385,092 B1 describes a method for a power converter system comprising a switching circuit having a plurality of switches operable to be turned on and off to cause current to flow to deliver power to a load. The therein described method includes the following: generating control signals for turning on and off the switches in the switching circuit; sensing the direction of current flow, wherein the direction of current flow is related to a likelihood of shoot-through in the switching circuit; providing a current vector signal indicative of the direction of current flow; adapting the dead time duration of the control signals for the switches in the switching circuit in response to the current vector signal.

SUMMARY OF THE INVENTION

An aspect of the invention relates to a resonant converter comprising: at least two transistor switches, out of which at least two are connected in parallel, and out of which a number of available transistor switches is available for performing a current switching of the resonant converter; a controlling module configured to determine whether an output power of the resonant converter is below an output power threshold value; and a switching module configured to employ a reduced number of transistor switches out of the number of available transistor switches, if the output power of the resonant converter is below the output power threshold value, wherein the reduced number is at least declined by one compared to the number of available transistor switches, wherein the switching module is configured to permute the employed reduced number of transistor switches over the available transistor switches.

The output power threshold value may be set to 70% or 50% or 25% of the maximum output power of the resonant converter, or any other reduced value output power value compared to the maximum output power, e.g. a value, for instance between 0% and 99% of the maximum output power of the resonant converter.

The controlling module is configured to determine whether an output power of the resonant converter is below an output power threshold value, in other words, the output power of the resonant converter, which corresponds to a currently supplied output power of the resonant converter is compared to a value, which defines a mid-power operation of the resonant converter, e.g. below 50% the maximum output power of the resonant converter. In addition a low-power operation of the resonant converter may be defined, e.g. below 25% the maximum output power of the resonant converter.

A second aspect of the invention relates to a high voltage generator comprising a resonant converter according to the first aspect.

A third aspect of the invention relates to an X-ray tube comprising a high voltage generator according to the second aspect.

A fourth aspect of the invention relates to a method for controlling a resonant converter, the method comprising the steps of: determining whether an output power of the resonant converter is below an output power threshold value; employing a reduced number of transistor switches out of a number of available transistor switches for performing a current switching of the resonant converter, if the output power of the resonant converter is below the output power threshold value, wherein the reduced number is at least declined by one compared to the number of available transistor switches; and permuting the employed reduced number of transistor switches over the available transistor switches.

The present invention provides an approach to overcome a not wanted hard commutation of the paralleled diode of a transistor switch of a resonant converter based on resonant current oscillation. This would cause higher losses in the inverter and voltage spikes at the transistor switches during hard commutation, example with increased dead time, or it would prevent a short circuit between high and low side switch, example with 500 ns dead time at light load conditions.

The present invention advantageously solves this problem by reducing the switch off time of the transistor switches during mid/low power mode of the inverter by activating an alternating switching scheme of the transistor switches. This enables save operation of the inverter.

In other words, the present invention advantageously lowers the switching time (switch off) of the transistor switches.

The present invention advantageously provides that a switching from parallel operating mode to alternating operation mode during mid and low power operation of the inverter is performed. The present invention proposes to reduce the switch off time of the transistor switches during mid/low power operation mode of the inverter by activating the alternating switching scheme.

In a low power operation mode, even less than half of the normally deployed switches might be deployed for current switching. This enables save operation of the inverter. The alternating switching mode enables faster switch off times of the transistor switches because of the higher current through one single transistor switch. The following further explains this context, td(off) is decreasing with increased collector current Ic.

In other words, the present invention advantageously proposes a switching control of the transistor switches. The switching control is normally controlled by a FPGA or PLD.

The present invention can be used within high power inverter for X-Ray systems, MRI amplifier or other medical imaging systems.

The term "IGBT switch" used within the description of the present invention may relate to a three-terminal power semiconductor device power transistor as a switch, in a single device. The IGBT switch may be used in medium- to high-power applications like switched-mode power supplies, traction motor control and induction heating or others. Large IGBT modules typically consist of many devices in parallel and can have very high current handling capabilities in the order of hundreds of amperes with blocking voltages of 6000 V, equating to hundreds of kilowatts.

In other words, the present invention advantageously permutes the employed reduced number of transistor switches over the available transistor switches. In this context, the notion of permutation relates to the act of permuting, or rearranging, the employed switches of the set of available switches into a particular sequence or order (unlike combinations, which are selections that disregard order), wherein the order refers to an order of switching. In other words an alternating switching scheme is applied to the transistors, ensuring a higher switching current trough a single transistor and an equally distributed engagement time for each of the transistor switches.

According to an exemplary embodiment of the present invention, the at least two transistor switches are at least two insulated-gate bipolar transistors and the switching module is configured to employ insulated-gate bipolar transistors as the transistor switches.

This advantageously provides significantly higher blocking voltages compared to an available MOSFET for high power applications.

According to an exemplary embodiment of the present invention, the switching module is configured to employ one transistor switch out of two or more available transistor switches.

This advantageously provides an improved switching scheme.

According to an exemplary embodiment of the present invention, the controlling module is configured to set the output power threshold value to a predefined threshold value.

This advantageously provides an improved setting of the mid/low power mode of the inverter.

According to an exemplary embodiment of the present invention, the controlling module is configured to adapt the output power threshold value based on at least one operation condition of the resonant converter.

This advantageously provides adapted setting of the mid/low power mode of the inverter.

According to an exemplary embodiment of the present invention, the controlling module is configured to adapt the output power threshold value based on a measured ambient temperature or chip temperature value as the at least one operation condition of the resonant converter.

According to an exemplary embodiment of the present invention, the switching module is further configured to save in a semiconductor memory which transistor switch or transistor switches were active in a previous switching cycle in order to decide which transistor switch or transistor switches are used in the next cycle. The saving may be performed in a semiconductor memory or in any other electronic data storage device.

A computer program performing the method of the present invention may be stored on a computer-readable medium. A computer-readable medium may be a punched card, a (floppy) disk storage medium, a hard disk, a CD, a DVD, an USB (Universal Serial Bus) storage device, a RAM (Random Access Memory), a ROM (Read Only Memory) and an EPROM (Erasable Programmable Read Only Memory). A computer-readable medium may also be a data communication network, for example the Internet, which allows downloading a program code or further systems.

The methods, systems and devices described herein may be implemented as software in a Digital Signal Processor, DSP, in a micro-controller, in a FPGA, in a PLD or in any other side-processor or as hardware circuit within an application specific integrated circuit, ASIC.

The present invention can be implemented in digital electronic circuitry, or in computer hardware, firmware, software, or in combinations thereof, e.g. in available hardware of conventional mobile devices or in new hardware dedicated for processing the methods described herein.

The present invention can be implemented for the use of image reconstruction in various image processing applications and aims at demonstrating the usefulness of this transformation for image altering and segmentation tasks.

A more complete appreciation of the invention and the attendant advantages thereof will be more clearly understood by reference to the following schematic drawings, which are not to scale, wherein.

DETAILED DESCRIPTION OF EMBODIMENTS

The illustration in the drawings is purely schematically and does not intend to provide scaling relations or size information. In different drawings, similar or identical elements are provided with the same reference numerals. Generally, identical parts, units, entities or steps are provided with the same reference symbols in the description.

Figure 1:
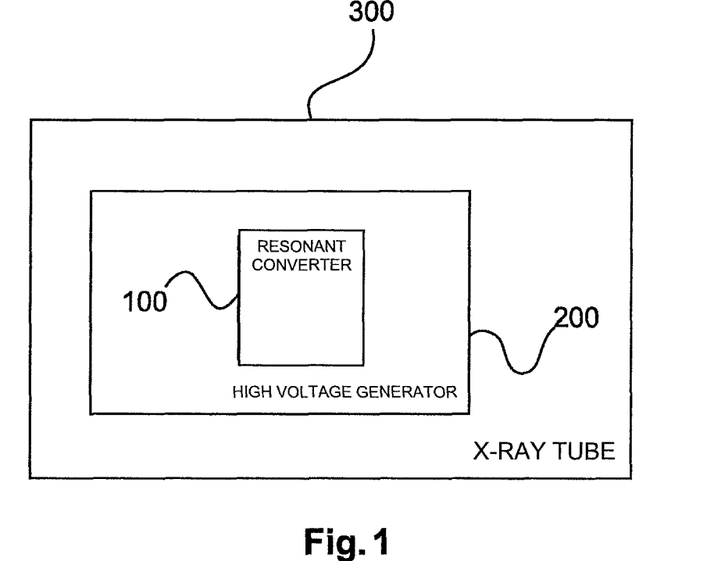
FIG. 1 shows a schematic diagram of an X-ray tube comprising a high voltage generator according to an exemplary embodiment of the invention.

FIG. 1 shows a schematic diagram of an X-ray tube comprising a high voltage generator according to an exemplary embodiment of the invention. An X-ray tube 300 may comprise a high voltage generator 200, which comprises a resonant converter 100.

The X-ray tube 300 may be used for X-ray computed tomography, a technology that uses computer-processed X-rays to produce tomographic images (virtual 'slices') of specific areas of the scanned object. The high voltage generator 200 may be used for producing X-rays, there may be a cathode, which emits electrons into the vacuum and an anode to collect the electrons, thus establishing a flow of electrical current, known as the beam, through the tube. A high voltage power source, for example 30 to 150 kilovolts (kV), is connected across the cathode and the anode to accelerate the electrons. The X-ray spectrum depends on the anode material and the accelerating voltage.

Figure 2:
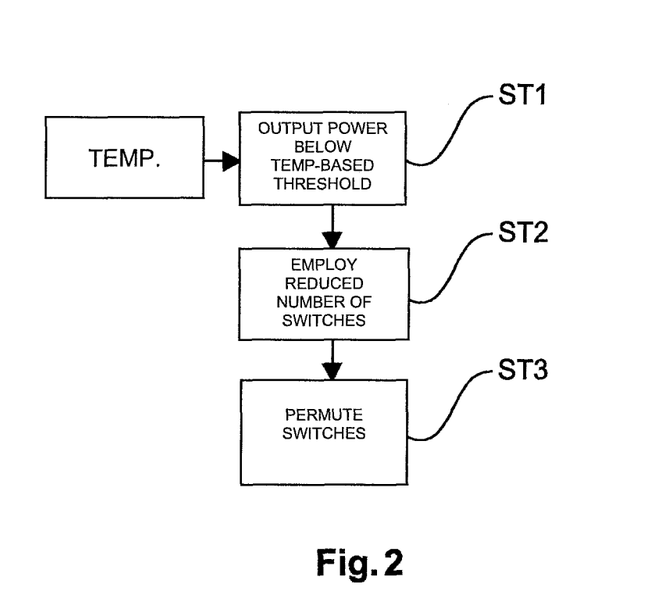
FIG. 2 shows a schematic flowchart diagram of a method for a resonant converter according to an exemplary embodiment of the invention.

FIG. 2 shows a schematic flowchart diagram of a method for a resonant converter according to an exemplary embodiment of the invention.

The method is visualized in terms of a block diagram. The method may comprise three steps ST1, ST2, and ST3.

As a first step of the method, determining ST1 whether an output power of the resonant converter is below a threshold value is conducted.

As a second step of the method, employing ST2 a reduced number of transistor switches out of a number of available transistor switches for performing a current switching of the resonant converter is conducted, if the output power of the resonant converter is below the output power threshold value, wherein the reduced number is at least declined by one compared to the number of available transistor switches.

As a third step of the method, permuting ST3 the employed reduced number of transistor switches over the available transistor switches is performed.

According to an exemplary embodiment of the invention, these steps may be carried out simultaneously, divided into multiple operations or tasks or iteratively repeated. The iteration of the steps may be implemented recursively, by count-controlled loops or by condition-controlled loops.

Figure 3:
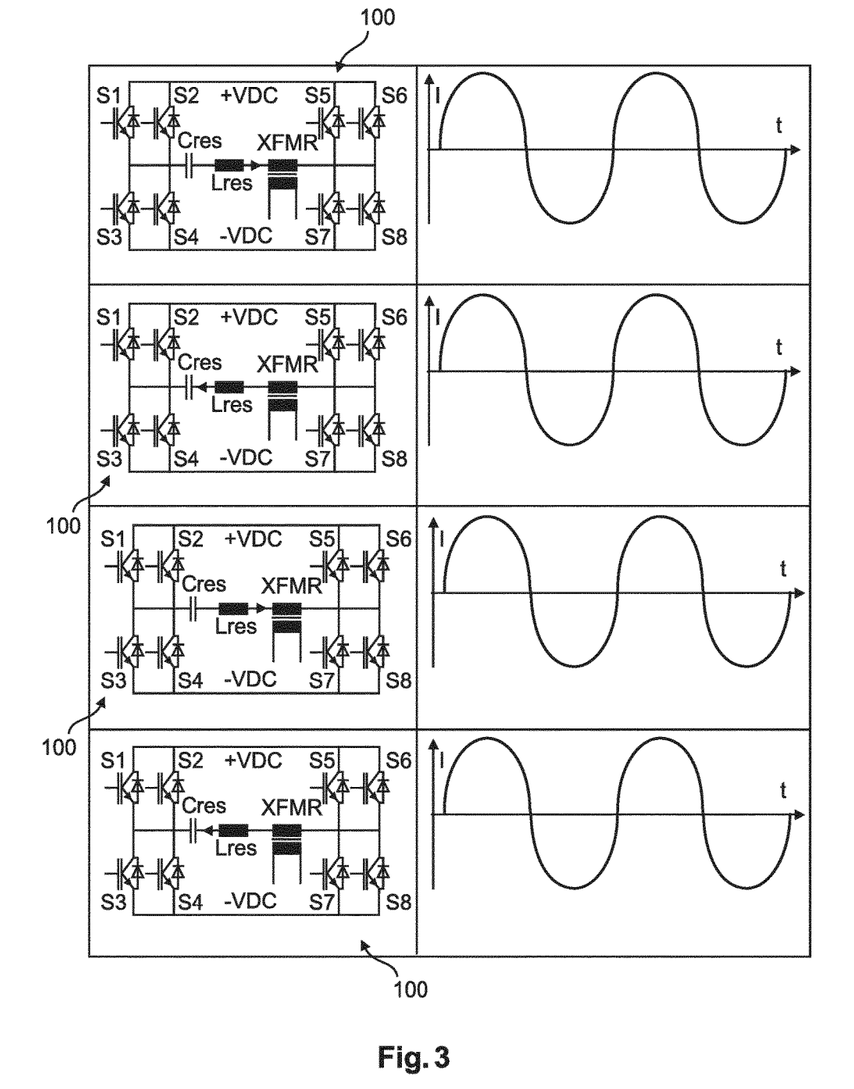
FIG. 3 shows a schematic diagram of a switching scheme of a resonant converter for explaining the invention.

FIG. 3 shows a schematic diagram of a switching scheme of a resonant converter for explaining the invention.

A parallel switching mode of four current switching events of one current switching cycle is depicted, the first current switching depicted on top followed by the subsequent current switchings ordered from top to bottom. For each current switching, the circuit on left and the current versus time relation on the right is shown.

FIG. 3 shows a resonant converter 100 comprising insulated-gate bipolar transistors as the transistor switches S1-S8.

For the first current switching of the cycle, the conducting IGBTs are the IGBT or transistor switches S1 and S2 as well as transistor switches S7 and S8. The arrow over the inductor $L_{res}$ indicates the current direction. The current flow is corresponding to the relation as depicted in the first quadrant in the graph of the sinusoidal function on the right.

For the second current switching of the cycle, the conducting IGBTs are the IGBT or transistor switches S3 and S4 as well as transistor switches S5 and S6. The arrow over the inductor $L_{res}$ indicates the current direction. The current flow is corresponding to the relation as depicted in the second quadrant in the graph of the sinusoidal function on the right.

For the third current switching of the cycle, the conducting IGBTs are the IGBT or transistor switches S1 and S2 as well as transistor switches S7 and S8. The arrow over the inductor $L_{res}$ indicates the current direction. The current flow is corresponding to the relation as depicted in the third quadrant in the graph of the sinusoidal function on the right.

For the fourth current switching of the cycle, the conducting IGBTs are the IGBT or transistor switches S3 and S4 as well as transistor switches S5 and S6. The arrow over the inductor $L_{res}$ indicates the current direction. The current flow is corresponding to the relation as depicted in the fourth quadrant in the graph of the sinusoidal function on the right.

For all current switchings of the current switching cycle presented above, a switching of each of the transistors occurred in each current switching. The number of transistor switches which were employed in each current switching was equal to the number of available transistor switches.

In an alternate switching scheme, only one transistor switch might be employed for each current switching:

For the first current switching of the alternate cycle, the conducting IGBTs are the IGBT or transistor switch S1 as well as transistor switch S7. The current flow is corresponding to the relation as depicted in the first quadrant in the graph of the sinusoidal function on the right.

For the second current switching of the alternate cycle, the conducting IGBTs are the IGBT or transistor switch S4 as well as transistor switch S6. The current flow is corresponding to the relation as depicted in the second quadrant in the graph of the sinusoidal function on the right.

For the third current switching of the alternate cycle, the conducting IGBTs are the IGBT or transistor switch S2 as well as transistor switch S8.

For the fourth current switching of the alternate cycle, the conducting IGBTs are the IGBT or transistor switch S3 as well as transistor switch S5.

Figure 4:
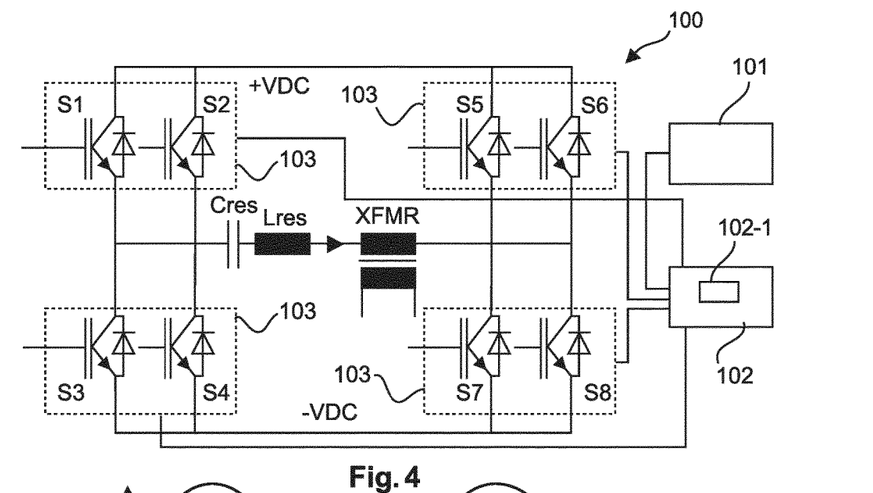
FIG. 4 shows a schematic diagram of a circuit of a resonant converter according to an exemplary embodiment of the invention.

FIG. 4 shows a schematic diagram of a circuit of a resonant converter according to an exemplary embodiment of the invention. In FIG. 4, a double IGBT full bridge configuration of a resonant converter is shown.

A resonant converter 100 may comprise eight transistor switches S1-S8, wherein two transistor switches are connected in parallel. In FIG. 4, two transistor switches S1, S2 are connected in parallel, two transistor switches S3, S4 are connected in parallel, two transistor switches S5, S6 are connected in parallel, and two transistor switches S7, S8 are connected in parallel. For the depicted resonant converter 100 of FIG. 4, four transistor switches are available for performing a current switching of the resonant converter 100.

The resonant converter 100 may further comprise a controlling module 101 configured to determine whether an output power of the resonant converter is below an output power threshold value.

The resonant converter 100 may further comprise a switching module 102 configured to employ a reduced number of transistor switches out of a number of available transistor switches S1-S8 for performing a current switching of the resonant converter, if the currently needed output power of the resonant converter is below the output power threshold value, wherein the reduced number is at least declined by one compared to the number of available transistor switches, and configured to permute the employed reduced number of transistor switches over the available transistor switches S1-S8. The switching module 102 may further comprise memory 102-1.

The switching module 102 may further be configured to save in the memory 102-1 which transistor switch or transistor switches S1-S8 were active in a previous current switching cycle in order to decide which transistor switch or transistor switches S1-S8 are used in the next current switching cycle. For the present circuit, the reduced number is two transistor switches and the available number of transistor switches is four. For instance, during one cycle, only two transistors, e.g. transistor switch S1 as well as transistor switch S7, are used instead of S1, S2, S7, S8 which all would be available for the same direction of current flow through the circuit. During another cycle, two transistors, e.g. transistor switch S4 as well as transistor switch S5, are used instead of S3, S4, S5, S6 which all would be available for the same other direction of current flow through the circuit.

Two transistor switches S1, S2; S3, S4; S5, S6; S7, S8 connected in parallel may form a switching pair 103. Each switching pair 103 is connected to the switching module 102, and may receive controlling commands, e.g. a switching command addressed to one of the transistor switches S1-S8. Instead of the inverter full-bridge, also using an inverter half-bridge or using any other bridge circuit is possible.

The inverter may generate a sinusoidal current through the resonant circuit comprising an inductor Lres, a capacitance Cres and a transformer XFMR.

This resonant circuit is driven by current switching of the switches S1, S2, S3, S4, S5, S6, S7, and S8 supplying the driving voltage represented by +VCD to −VCD. This is realized by switching the switches S1 and S2 simultaneously with the switches S7 and S8 to generate the positive current half-wave. Transistor switches S3 and S4 simultaneously with switches S5 and S6 will carry the negative current half-wave. The switching from one diagonal to the other is done in full resonant mode, wherein the resonant frequency is the switching frequency from one diagonal to the other.

Therefore, the number of available transistor switches may depend on the current path in the circuit and the number of all transistors of the circuit, e.g. the term available as used in the present description may refer to the meaning of available for a desired current switching, in the example provided above transistor switches S1, S2, S7, S8 are available for the same current flow through the circuit, even though eight transistor switches are present in the circuit, but for a certain current path that enables a voltage to be applied across the load in a certain direction only these four transistor switches S1, S2, S7, S8 are available. And out of these four transistor switches only two transistor switches are used, but which two are used, is permuted.

The IGBTs are in parallel because of the high currents at full output power of the inverter.

Figure 5:
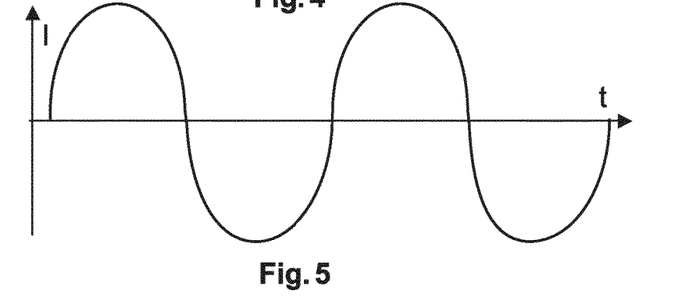
FIG. 5 shows a schematic diagram of an output current of the resonant converter for explaining the invention.

FIG. 5 shows a schematic diagram of an output current of the resonant converter for explaining the invention. The y-axis shows the output current of the IGBT inverter full-bridge, the x-axis shows the time. The graph shows two positive and two negative current half-waves of one current switching cycle.

Figure 6:
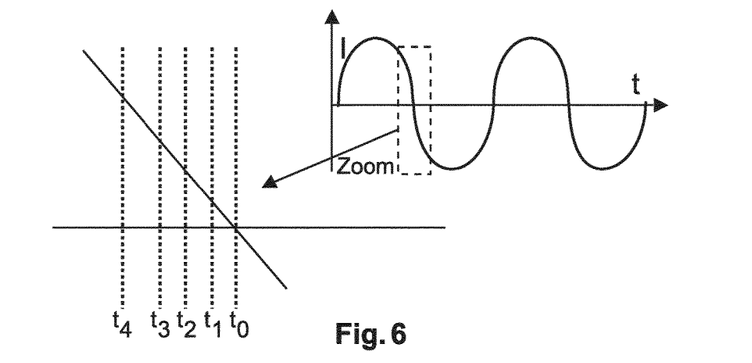
FIG. 6 shows a schematic diagram of a zero-crossing of the output current of the resonant converter for explaining the invention.

FIG. 6 shows a schematic diagram of a zero-crossing of the output current of the resonant converter for explaining the invention.

On the lower left panel in FIG. 6, a description of the different ideal switching states is presented: the stages t4 to t0 are presented idealized, normally the different stages could overlap. The switching mechanism starts at t4, about −800 ns before t0, the zero-crossing of the resonant current. At t4, the switches (which are still conducting) S1, S2, S7 and S8 get the order to switch off After the IGBT specific td(OFF) and tf (which is current and temperature dependent), the switches will be completely switched off at t3. At t2 the IGBTs S3, S4, S5 and S6 get the order to switch on.

After the IGBT specific td(ON) and tr (current and temperature dependent) the IGBTs are switched on completely at t1, right before t0 the zero crossing of the resonant current. tf and tr are neglected for further considerations, because they are much lower compared to td(OFF) and td(ON). The time between t4 and t2 is called tdead, e.g. referred to as deadtime, it is supposed to be higher than the switch off time of the IGBT in order to prevent a bridge short circuit (high and low side switched on simultaneously).

An example is presented in the following:

Assuming a switch off current of 400 A (200 A per IGBT when operated in parallel mode) a fast switching IGBT does have the following parameters at 125° C. die or temperature or ambient temperature:

Assuming td(OFF) of 450 ns (conditions: 200 A switching off and 125° C. ambient temperature), assuming td(ON) of 250 ns (conditions: 200 A switching off and 125° C. ambient temperature), for instance tdead is set to 500 ns, (fixed value), t3 is set to −350 ns, t2 is set to −300 ns, t1 is set to −50 ns, t0 is set to 0 ns.

The following difficulty arises: The deadtime would be too short because of increased switch off time of the IGBT when switching small currents. Therefore we need to increase the dead time:

Assuming tdead is set to 600 ns, further, t4 is set to −800 ns, t3 is set to −200 ns, t2 is set to −200 ns, t1 is set to +50 ns. This implies that switch on is after the zero crossing and causes hard commutation of the freewheeling diode.

The following difficulty arises: The IGBT is switched on too late (after the zero-crossing). Both difficulties can be solved by using the alternating switching scheme instead of the parallel switching approach.

Figure 7:
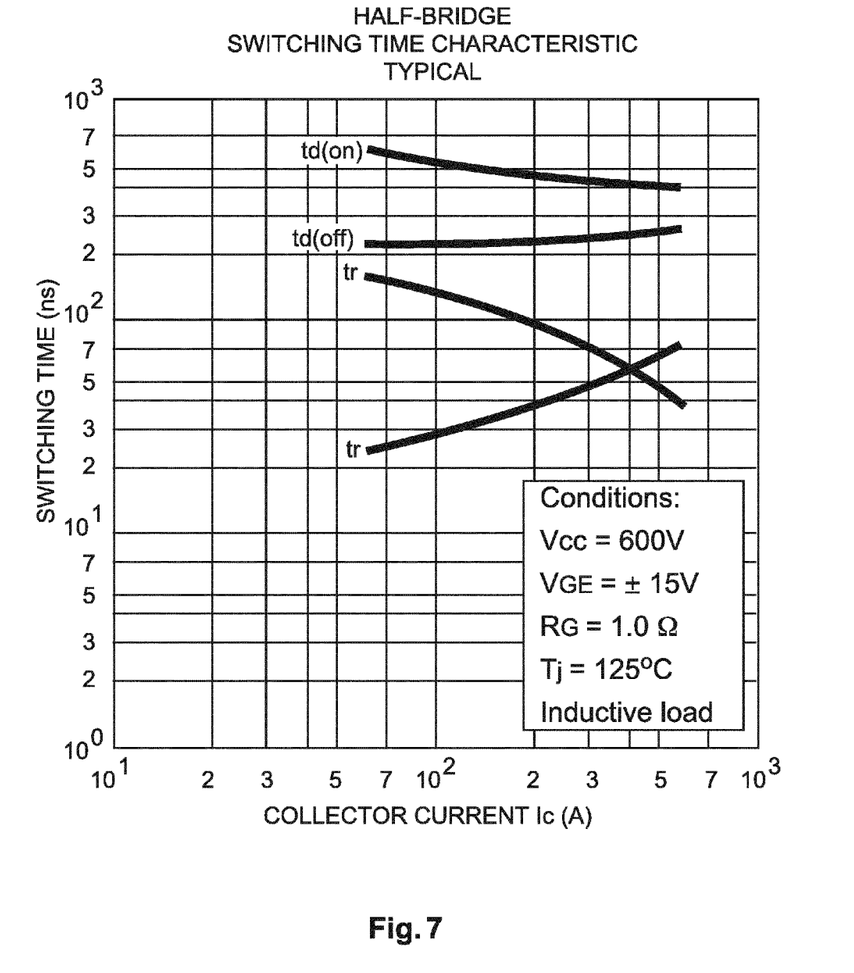
FIG. 7 shows a schematic diagram switching time vs. the collector current for explaining the invention.

FIG. 7 shows a schematic diagram switching time vs. the collector current for explaining the invention. FIG. 7 is a log-log plot in terms of a two-dimensional graph of numerical data that uses logarithmic scales on both the horizontal and vertical axes.

The y-axis shows the switching time in nanoseconds in logarithmic scale, the x-axis shows the collector current IC in ampere in logarithmic scale.

In another exemplary embodiment of the present invention, a computer program or a computer program element is provided that is characterized by being adapted to execute the method steps of the method according to one of the preceding embodiments, on an appropriate system. Characteristic curves for td(on), td(off), and tr are depicted in the graph.

According to a further exemplary embodiment of the present invention, the computer program element might therefore be stored on a computer unit, which might also be part of an embodiment of the present invention. This computing unit may be adapted to perform or induce a performing of the steps of the method described above.

Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it, which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network.

According to a further exemplary embodiment of the present invention, a medium for making a computer program element available for downloading is provided, the computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A resonant converter comprising:
    at least two transistor switches, out of which at least two are connected in parallel, and out of which a number of available transistor switches is available for performing a specific desired current switching of the resonant converter depending on the current path;
    a controlling module configured to determine whether an output power of the resonant converter is below an output power threshold value; and
    a switching module configured to employ a reduced number of transistor switches out of the number of available transistor switches, if the output power of the resonant converter is below the output power threshold value, wherein the reduced number is at least declined by one compared to the number of available transistor switches, wherein the switching module is configured to permute the employed reduced number of transistor switches over the available transistor switches,
    wherein the controlling module is configured to adapt the output power threshold value based on a measured ambient temperature value of the resonant converter.

2. The resonant converter according to claim 1, wherein the at least two transistor switches are at least two insulated-gate bipolar transistors and the switching module is configured to employ insulated-gate bipolar transistors as the transistor switches.

3. The resonant converter according to claim 1, wherein the switching module is configured to employ one transistor switch out of two available transistor switches.

4. The resonant converter according to claim 1, wherein the controlling module is configured to set the output power threshold value to a predefined threshold value.

5. The resonant converter according to claim 1, wherein the switching module is further configured to save in a memory which transistor switch or transistor switches were active in a previous current switching cycle in order to decide which transistor switch or transistor switches are used in the next current switching cycle.

6. A high voltage generator comprising a resonant converter according to claim 1.

7. An X-ray tube comprising a high voltage generator according to claim 6.

8. A method for controlling a resonant converter, the method comprising:
    setting an output power threshold value to a predefined value including adapting the output power threshold value based on a measured ambient temperature value of the resonant converter;
    determining whether an output power of the resonant converter is below the output power threshold value;
    employing a reduced number of transistor switches out of a number of available transistor switches for performing a current switching of the resonant converter, if the output power of the resonant converter is below the output power threshold value, wherein the reduced number is at least declined by one compared to the number of available transistor switches; and
    permuting the employed reduced number of transistor switches over the available transistor switches.

9. The method according to claim 8, further comprising employing insulated-gate bipolar transistors as the transistor switches.

10. The method according to claim 8, further comprising employing one transistor switch out of two available transistor switches.

11. The method according to claim 8, further comprising setting the output power threshold value to a predefined value.

* * * * *